(12) United States Patent
Melsen (10) Patent No.: US 8,165,156 B1
(45) Date of Patent: Apr. 24, 2012

(54) ETHERNET DSL ACCESS MULTIPLEXER AND METHOD PROVIDING DYNAMIC SERVICE SELECTION AND END-USER CONFIGURATION

(75) Inventor: Torben Melsen, Holstebro (DK)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 577 days.

(21) Appl. No.: 10/596,513

(22) PCT Filed: Dec. 16, 2003

(86) PCT No.: PCT/SE03/01982
§ 371 (c)(1),
(2), (4) Date: Dec. 20, 2007

(87) PCT Pub. No.: WO2005/060208
PCT Pub. Date: Jun. 30, 2005

(51) Int. Cl.
*H04L 12/28* (2006.01)
*H04L 29/06* (2006.01)
*H04L 29/12* (2006.01)

(52) U.S. Cl. ......... 370/466; 370/468; 370/493; 370/489

(58) Field of Classification Search .................. 370/395, 370/389
See application file for complete search history.

(56) References Cited

U.S. PATENT DOCUMENTS

| | | | | |
|---|---|---|---|---|
| 6,529,479 | B1 * | 3/2003 | Suzuki | 370/236.1 |
| 6,714,916 | B1 * | 3/2004 | Robertson et al. | 705/7.18 |
| 6,977,906 | B2 * | 12/2005 | Owens et al. | 370/252 |
| 7,277,442 | B1 * | 10/2007 | Holmgren et al. | 370/395.53 |
| 2002/0101881 | A1 * | 8/2002 | Sundaresan et al. | 370/468 |
| 2003/0039244 | A1 * | 2/2003 | Owens et al. | 370/389 |
| 2003/0039268 | A1 * | 2/2003 | Chong et al. | 370/466 |
| 2003/0053443 | A1 | 3/2003 | Owens | |
| 2004/0028291 | A1 * | 2/2004 | Broddin et al. | 382/284 |
| 2004/0105444 | A1 * | 6/2004 | Korotin et al. | 370/395.5 |
| 2005/0163166 | A1 * | 7/2005 | Ying et al. | 370/493 |

FOREIGN PATENT DOCUMENTS

WO WO 0131843 A2 5/2001

* cited by examiner

*Primary Examiner* — Joe Cheng
*Assistant Examiner* — Jason Harley (57) ABSTRACT

An Ethernet Digital Subscriber Line Access Multiplexer (DSLAM) and method of dynamically creating a service binding in the Ethernet DSLAM based on a service selection made by an end-user. The end-user may use the PPPoE or IEEE802.1X access protocols to provide login credentials indicating the desired service. The login credentials are validated towards a RADIUS server, which configures the Ethernet DSLAM with the attributes of the service binding, including an identified Permanent Virtual Circuit (PVC) to carry the desired service. The Ethernet DSLAM may map service-VLANs to user MAC addresses or to user-VLANs to establish the service binding. The Ethernet DSLAM uses the identified PVC for downstream traffic for the corresponding service binding and thereby "trains" a learning bridge network terminal to use the correct PVC for upstream traffic.

18 Claims, 8 Drawing Sheets

ETHERNET DSL ACCESS MULTIPLEXER AND METHOD PROVIDING DYNAMIC SERVICE SELECTION AND END-USER CONFIGURATION

BACKGROUND OF THE INVENTION

1. Technical Field of the Invention

The present invention relates generally to digital communication systems. More particularly, and not by way of limitation, the invention is directed to an Ethernet Digital Subscriber Line Access Multiplexer (DSLAM) and method providing dynamic service selection and end-user configuration of service bindings.

2. Description of Related Art

Ethernet is a packet-based transmission protocol that is primarily used in local area networks (LANs). Ethernet is the common name for the IEEE 802.3 industry specification. Data is transmitted in Ethernet frames. Each frame includes a preamble with 64 bits utilized for synchronization. A Start of Frame Delimiter (SFD), a destination address, a source address, and a length/type identifier follow the preamble. Media Access Control (MAC) client data, together with a Packet Assembler/Disassembler (PAD) may vary in length from 46 to 1500 bytes (octets). A Frame Check Sequence (FCS) adds four more octets. The frame size is counted from the destination address to the FCS, inclusive, and thus may vary between 64 and 1518 octets, not including a Virtual Local Area Network (VLAN) tag, which adds 4 octets.

When establishing a data session between an end-user device and a service provider, a service binding creates a logical connection between the end-user device and a service provided by some form of service provider, for example, a Network Service Provider or Application Service Provider. Two types of service bindings currently in use in the industry are referred to herein as the basic service binding and the advanced service binding. The basic service binding is established in an Ethernet DSLAM between a VLAN within the Access Domain and an Asynchronous Transfer Mode (ATM) Permanent Virtual Circuit (PVC) on the local DSL loop. The advanced service binding is created in a Broadband Remote Access Server (BRAS) between the IP client and the service. The basic service binding may also be combined with the BRAS-based advanced service binding.

Figure 1:
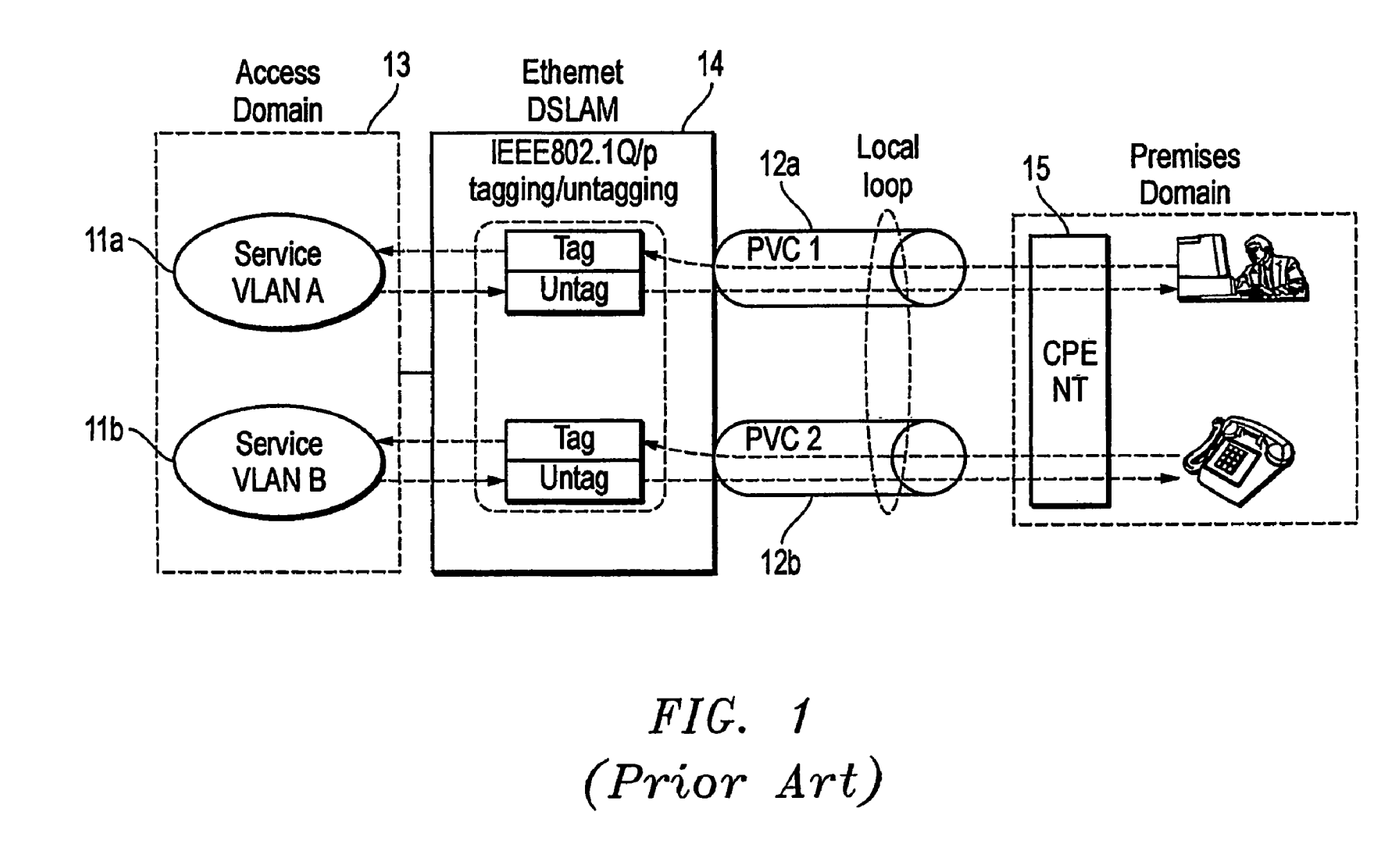
FIG. 1 (Prior Art) is a simplified block diagram illustrating an existing basic service binding.

FIG. 1 is a simplified block diagram illustrating a basic service binding. The IEEE has developed a standard for Ethernet access control, IEEE802.1x. Originally this standard was intended for switched Ethernet networks, but during the standardization process it was adapted to be used for wireless LANs (IEEE802.11). However, the basic principles are still considered applicable for controlling access to switched Ethernet. IEEE802.1x is an integrated part of the Windows XP operating system. Future versions of other operating systems may also include the feature, making this a commonly accepted login interface.

A basic service binding is created by assigning an IEEE802.1Q VLAN ID of a Service VLAN (S-VLAN) 11a, 11b to a subscriber line PVC 12a, 12b. An IEEE802.1p priority value is also associated with this binding, and is used to ensure Quality of Service (QoS) within the Access Domain 13. The Ethernet DSLAM 14 tags upstream traffic, from the Customer Premises Equipment (CPE)/Network Terminal (NT) 15 to the S-VLAN, with the assigned VLAN ID and priority value before forwarding the traffic upstream. Downstream Ethernet traffic, from the S-VLAN to the CPE/NT is mapped by the Ethernet DSLAM to the correct PVC by inspecting the VLAN ID, 802.1p priority, and destination MAC address. Each subscriber line may have multiple PVCs corresponding to different services.

Figure 2:
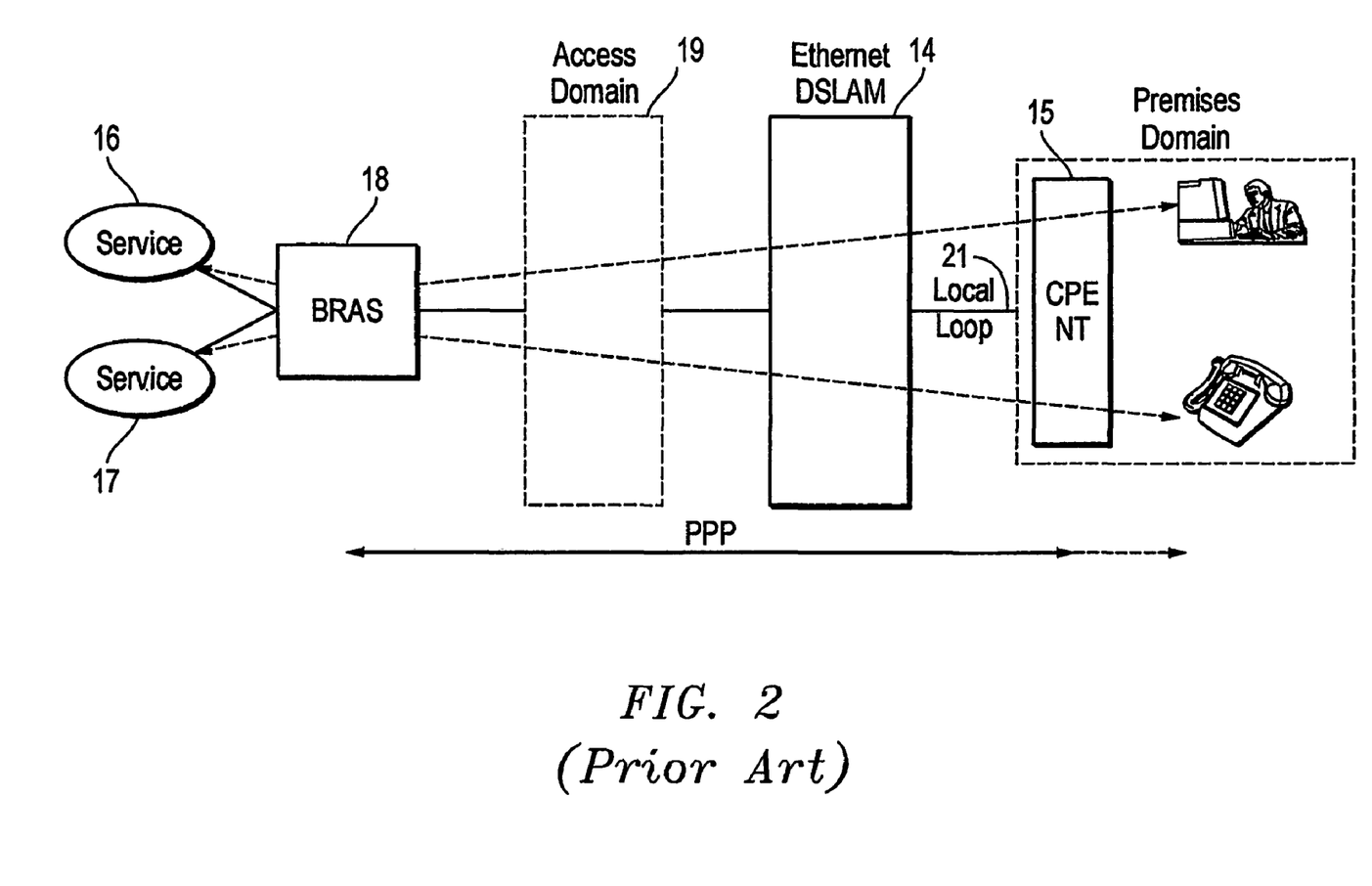
FIG. 2 (Prior Art) is a simplified block diagram illustrating an existing advanced service binding.

FIG. 2 is a simplified block diagram illustrating an advanced service binding. Services 16, 17 connect through a BRAS 18 to an access domain 19 and the Ethernet DSLAM 14, which connects through a local loop 21 to the CPE/NT 15. The service bindings made in a BRAS are often based on the Point-to-Point Protocol (PPP) as the access protocol. With this protocol, a session is initiated from the end-user device (CPE/NT) towards the BRAS. During this session establishment, the service binding is created, typically based on the login credentials supplied by the end-user's CPE/NT.

Figure 3:
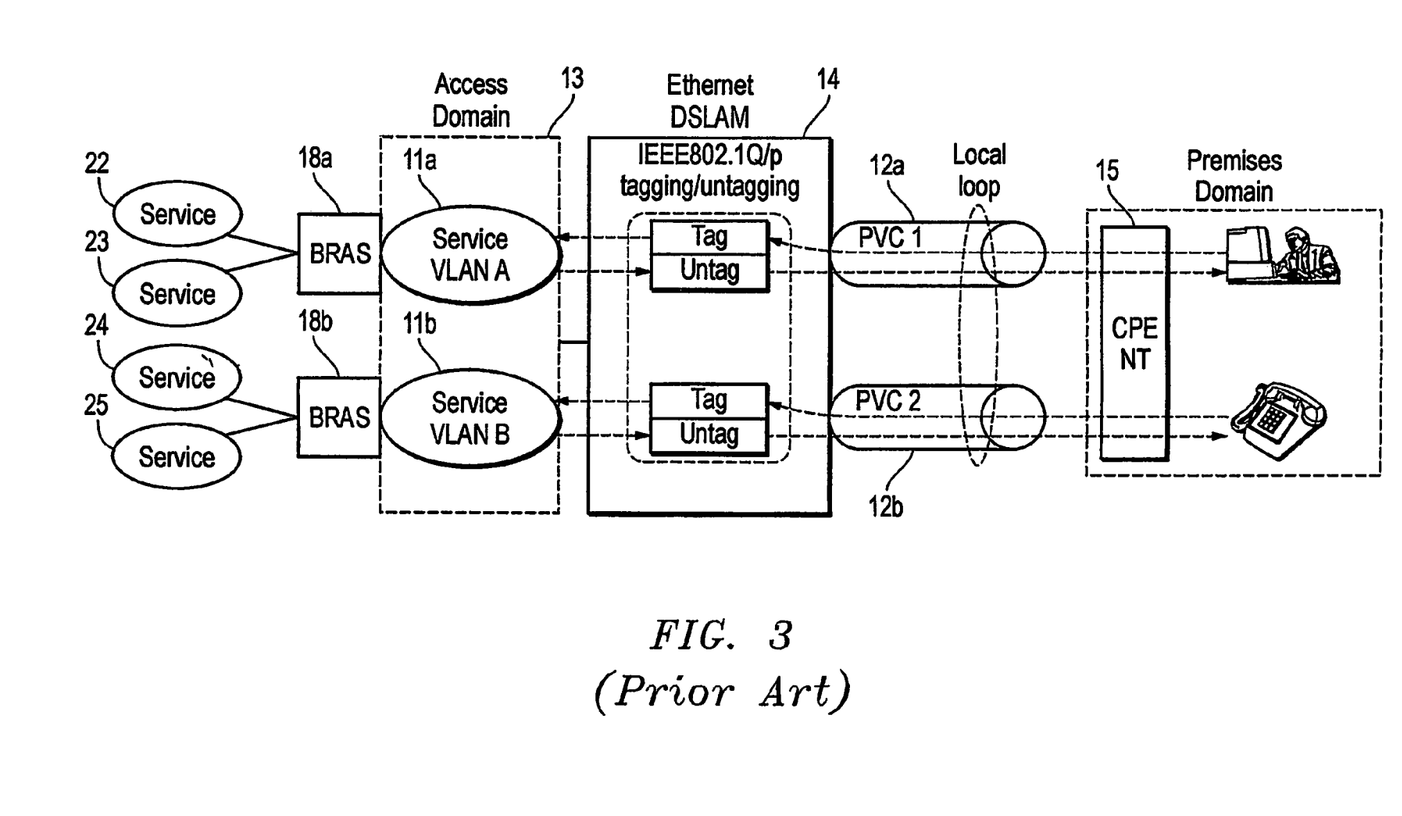
FIG. 3 (Prior Art) is a simplified block diagram illustrating the existing basic service binding combined with the existing advanced service binding.

FIG. 3 is a simplified block diagram illustrating a basic service binding combined with the BRAS-based advanced service binding. The basic service binding portion is again created by assigning an IEEE802.1Q VLAN ID of an S-VLAN 11a, 11b to a subscriber line PVC 12a, 12b. An IEEE802.1p priority value is also associated with this binding, and is used to ensure QoS within the access domain 13. The Ethernet DSLAM 14 tags upstream traffic, from the CPE/NT 15 to the S-VLAN, with the assigned VLAN ID and priority value before forwarding the traffic upstream. Downstream Ethernet traffic from the S-VLAN to the CPE/NT is mapped by the Ethernet DSLAM to the correct PVC by inspecting the VLAN ID, 802.1p priority, and destination MAC address. Each subscriber line may have multiple PVCs corresponding to different services. The advanced service binding portion includes BRASs 18a, 18b which connect respective S-VLANs 11a, 11b to services 22-25.

SUMMARY OF THE INVENTION

There are problems, however, with the basic, advanced, and consequently, the combined service bindings. The problems with the basic service binding method are as follows:

Inflexible mapping: A limitation with the VLAN-per-Service method is that end-users are semi-statically allocated to specific services. The PVC-VLAN mapping and other service characteristics (e.g., connection bandwidth) performed by the Ethernet DSLAM are controlled by the operation and maintenance (O&M) system, and only the O&M system can change these service bindings. The change of service can be made manually by the O&M operator, or by using the northbound interface of the O&M system. In the latter case, the end-user may be able to change the service binding on-line via a web-based service selection server that interfaces with the O&M system. The problem with that solution is that it assumes a connection exists to the server in order to perform the service selection, and furthermore it assumes that all end-user devices have an interface for displaying service options and selecting the desired service.

Low access granularity: Any end-user device connected to a specific PVC will be associated with the corresponding S-VLAN. However, it may be useful to be able to map different devices towards different services, although the devices share the same PVC, for example if only a single PVC is supported by the CPE modem (a very common situation today).

No access authentication: Virtually any device attached to a PVC is granted access to the corresponding S-VLAN. However, it is desirable to be able to validate end-user devices individually.

Not future proof: The future standard for Ethernet access (EFM) seems to be moving away from ATM (i.e., the PVC-based service mapping cannot be used anymore, and an alternative approach is necessary).

The main problem with the advanced (BRAS-based) service binding method is that it is a centralized approach with all access intelligence collected in one node, and with all traffic streams going though this node. This means that:

Single point of failure: The BRAS is a single point of failure, typically affecting thousands of end-users in case of a node failure.

Poor downward scalability: Even in a minimum configuration, a BRAS typically does not represent an economically reasonable access solution for small groups of end-users. The cost per end-user is simply too high.

Poor upward scalability: As end-users put higher and higher load on their broadband access connections, the performance requirements of the BRAS will increase dramatically to a level for which they are not designed.

Inefficient multicast support: A centralized approach using PPP as the access protocol does not efficiently support multicast. Other problems pertaining to PPP include protocol overhead, and difficulties in mapping quality-of-service indicators between different protocol layers.

Thus there is a particular need for an Ethernet DSLAM and service binding method that overcome the problems of the prior art. The present invention provides such a DSLAM and method.

The present invention is designed to combine advantageous elements of each of the existing service binding methods. The invention dynamically creates the service binding in the Ethernet DSLAM based on a service selection made by the end-user. Thus, the traditional BRAS is not required to create the dynamic service binding. The end-user may use the PPPoE or IEEE802.1X access protocols to provide login credentials indicating the desired service. The login credentials are validated towards a RADIUS server, and this server configures the Ethernet DSLAM with the attributes of the service binding.

One of these attributes is the local loop PVC to carry the desired service. The Ethernet DSLAM uses this PVC for downstream traffic for the corresponding service binding(s) and thereby "trains" a learning bridge CPE NT with multiple PVCs so that this modem will use the correct PVC for upstream traffic.

Thus, in one aspect, the invention is directed to an Ethernet DSLAM for providing dynamic service selection and end-user configuration of service bindings in a digital communication system. The Ethernet DSLAM includes means for receiving login credentials and a service request from an end-user device; means for authenticating the login credentials through an authentication server; and means for receiving from the authentication server, a plurality of attributes for configuring the Ethernet DSLAM to provide a service binding corresponding to the requested service. The attributes including an identification of an access network for the requested service, and an identification of a Permanent Virtual Circuit (PVC) on a local DSL loop associated with the end-user device. The Ethernet DSLAM also includes means for training a bridging network terminal (NT) having a plurality of PVCs to utilize the identified PVC for sending upstream traffic from the end-user terminal to the Ethernet DSLAM. The training means includes means for sending initial downstream traffic from the Ethernet DSLAM to the end-user device utilizing the identified PVC.

In another aspect, the invention is directed to an Ethernet DSLAM that includes a plurality of subscriber ports for receiving login credentials and service requests from end-user devices, and for communicating data traffic to and from the end-user devices. An identified subscriber port communicates with an identified end-user device. The Ethernet DSLAM also includes a traffic mapper that maps data traffic between a plurality of Service Virtual Local Area Networks (S-VLANs) and the subscriber ports. A RADIUS client in the DSLAM sends login credentials and a service request received from the identified end-user device to an external RADIUS server for authentication and receives from the external RADIUS server, a plurality of attributes for configuring the Ethernet DSLAM to provide a service binding corresponding to the requested service. The attributes include an identification of an S-VLAN through which the requested service is accessed, and an identification of a PVC on a local DSL loop associated with the end-user device. A Service Selection Controller in the DSLAM receives the attributes from the RADIUS client and sends mapping control information to the traffic mapper, thereby enabling the traffic mapper to establish a service binding between the identified end-user device and the S-VLAN through which the requested service is accessed.

In yet another aspect, the invention is directed to a method of providing dynamic service selection and end-user configuration of service bindings in a digital communication system. The method includes the steps of sending login credentials and a service request from an end-user device to an Ethernet DSLAM; sending the login credentials and service request from the Ethernet DSLAM to an authentication server; and sending from the authentication server to the Ethernet DSLAM, a plurality of service binding attributes. The attributes include an identification of an access network for the requested service, and an identification of a PVC on a local DSL loop associated with the end-user device. The Ethernet DSLAM utilizes the service binding attributes to configure a service binding corresponding to the requested service. Initial downstream traffic is sent from the Ethernet DSLAM to the end-user device utilizing the identified PVC, thereby training a bridging NT having a plurality of PVCs to utilize the identified PVC for sending upstream traffic from the end-user terminal to the Ethernet DSLAM.

In still yet another aspect, the invention is directed to a method of providing dynamic service selection and end-user configuration of service bindings in a digital communication system. The method includes the steps of configuring in an Ethernet DSLAM, a plurality of subscriber ports for communicating with a plurality of end-user devices; receiving login credentials and a service request from an identified end-user device utilizing an identified subscriber port; and sending the login credentials and the service request from a RADIUS client in the Ethernet DSLAM to an external RADIUS server for authentication. This is followed by receiving from the external RADIUS server, a plurality of attributes for a service binding corresponding to the requested service. The attributes include an identification of an S-VLAN through which the requested service is accessed, and an identification of a PVC on a local DSL loop associated with the end-user device. This is followed by configuring the Ethernet DSLAM to provide the service binding corresponding to the requested service; and mapping data traffic by the Ethernet DSLAM between the S-VLAN through which the requested service is accessed and the identified subscriber port communicating with the identified end-user device.

BRIEF DESCRIPTION OF THE DRAWINGS

In the following, the essential features of the invention will be described in detail by showing preferred embodiments, with reference to the figures of the attached drawings.

DETAILED DESCRIPTION OF THE INVENTION

In the following description, for purposes of explanation and not limitation, specific details are set forth, such as particular embodiments, circuits, signal formats etc. in order to provide a thorough understanding of the present invention. It will be apparent to one skilled in the art that the present invention may be practiced in other embodiments that depart from these specific details.

The present invention may provide two types of service bindings, MAC granularity and VLAN granularity. MAC granularity service bindings are made between service-VLANs and end-user devices with MAC addresses visible to the Ethernet DSLAM. VLAN granularity service bindings are made between service-VLANs and end-user VLANs visible to the Ethernet DSLAM. Thus, the end-user must use an Ethernet bridging network terminal (NT) to enable bindings of either type. If the end-user uses a routing NT, only the MAC address of this NT is visible to the Ethernet DSLAM, and the end-user VLANs are not visible through the router. Thus only a single service binding can be established, common for all devices behind the routing NT.

The following description will initially describe the invention using the MAC granularity type of service bindings. However, most of this description is also applicable to the VLAN granularity solution based on end-user VLANs. Specific issues pertaining to service bindings based on end-user VLANs are then discussed.

Figure 4:
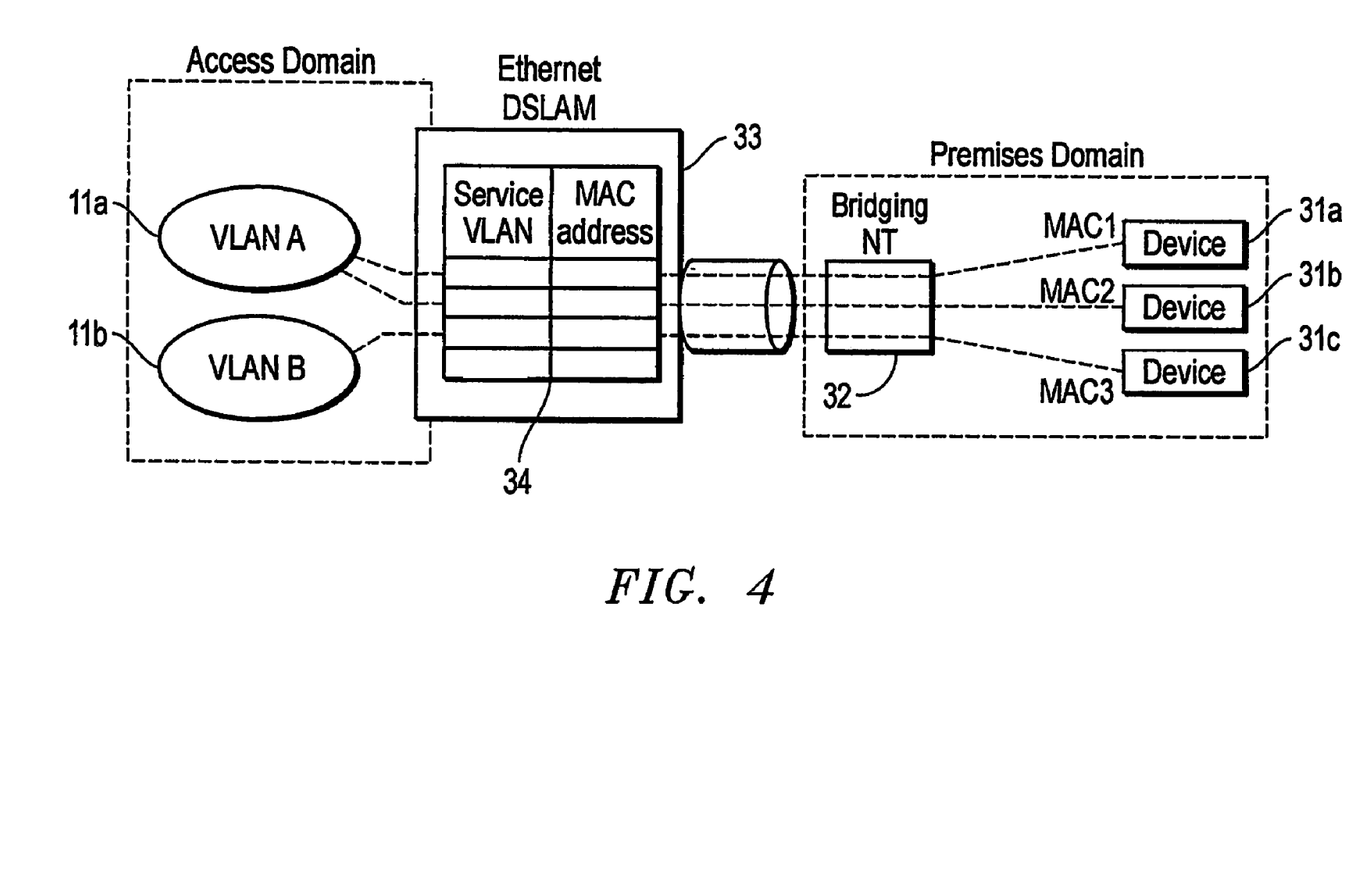
FIG. 4 is a simplified block diagram illustrating service bindings between end-user devices and service-VLANS in accordance with the MAC granularity embodiment of the present invention.

FIG. 4 is a simplified block diagram illustrating service bindings between end-user devices 31a-31c having MAC addresses MAC-1, MAC-2, and MAC-3, respectively, and service-VLANS 11a, 11b in accordance with the MAC granularity embodiment of the present invention. An Ethernet bridging NT 32 enables S-VLAN/MAC address bindings. An Ethernet DSLAM 33 includes a mapping function 34, which maps S-VLANs to MAC addresses, and vice versa. The mapping function may be implemented in the Ethernet DSLAM as a new software-based function, referred to herein as a Service Selection Handler (SSH) 34.

Figure 5:
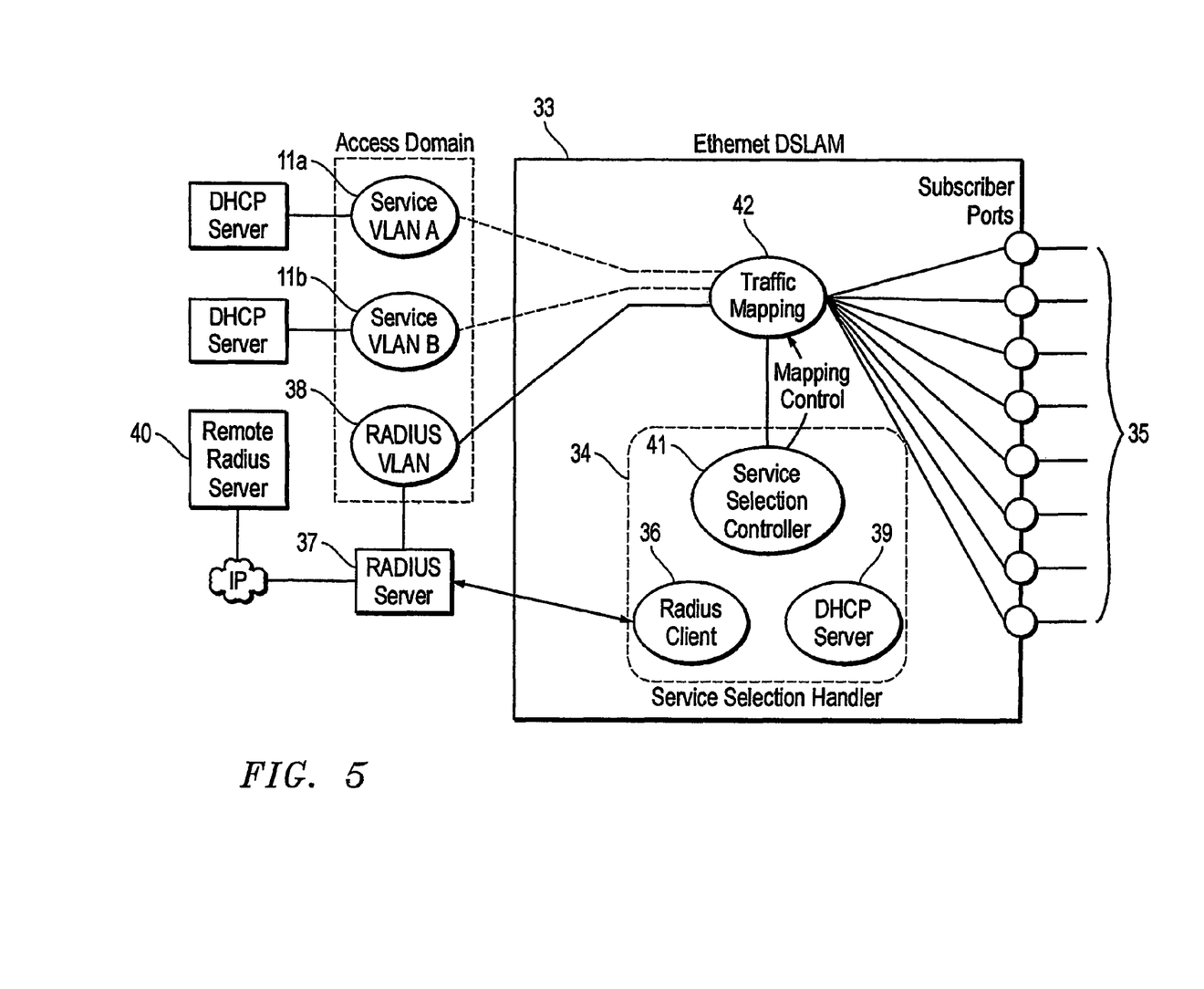
FIG. 5 is a functional block diagram illustrating a Service Selection Handler (SSH) and its context in the Ethernet DSLAM.

FIG. 5 is a functional block diagram illustrating the Service Selection Handler (SSH) 34 and its context in the Ethernet DSLAM 33. The primary task of the SSH is to create service bindings between end-user device MAC addresses (represented by subscriber ports 35) and the S-VLANs 11a, 11b. To do this, the SSH implements a RADIUS client function 36, similar to the functionality of a BRAS. The RADIUS client interacts with a remotely located RADIUS server 40, either directly or through a local proxy RADIUS server 37. The local RADIUS server sends traffic via a RADIUS VLAN 38 in the Access Domain to a Traffic Mapping function 42 in the Ethernet DSLAM 33. The SSH also includes a Dynamic Host Configuration Protocol (DHCP) server 39 and a Service Selection Controller 41, which sends mapping control instructions to the Traffic Mapping function 42 for mapping traffic to the various subscriber ports 35.

Several different ways of creating a service binding in the Ethernet DSLAM are possible: IEEE802.1x, PPPoE, HTTP/web interface, and Dynamic Host Configuration Protocol (DHCP) option-90. For all methods, the service may implicitly be selected based on the login credentials provided by the end-user device. In the MAC granularity embodiment, it is chosen to focus on IEEE802.1x and PPPoE.

When using either IEEE802.1x or PPPoE, the SSH 34 receives the login credentials from the end-user device 31a-31c, and validates the credentials against the remotely located RADIUS server 40. This may be done via the proxy RADIUS server 37. The RADIUS server (or the proxy) also informs the SSH about the S-VLAN ID corresponding to the credentials. The SSH then enables upstream traffic from the device's MAC address to the appointed S-VLAN, and vice versa for downstream traffic.

By using different login credentials, the end-user is thereby able to select a preferred service. Similar to a traditional BRAS, the domain portion of the username may be used as the selection criteria. For example, joe@isp1.com and joe@isp2.com are usernames that may be utilized for accessing two different Internet Service Providers (ISPs).

Figure 6:
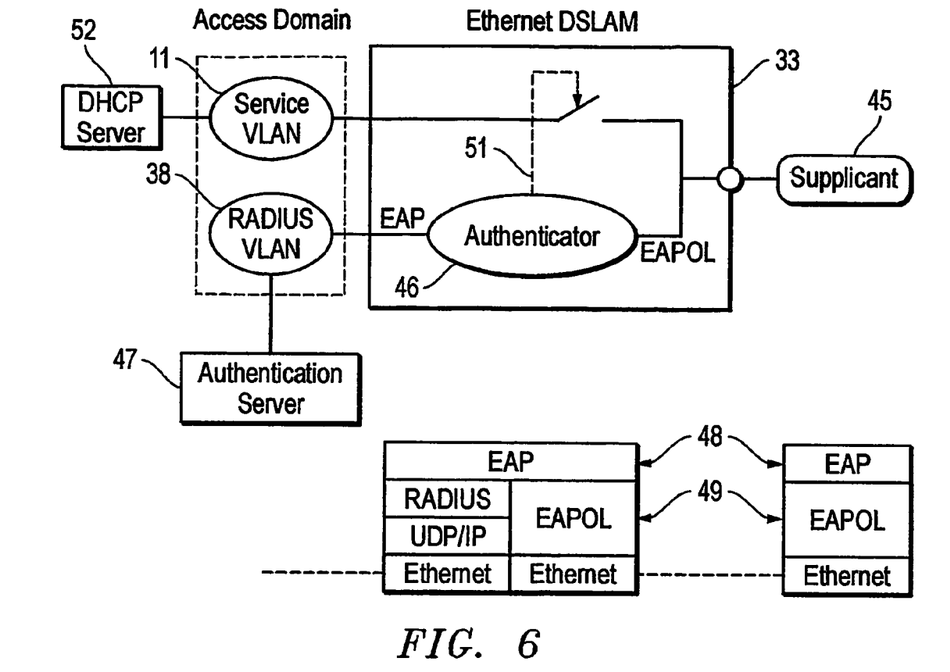
FIG. 6 is a functional block diagram illustrating functional roles when utilizing the IEEE802.1x method of creating a service binding in the Ethernet DSLAM.

FIG. 6 is a functional block diagram illustrating functional roles when utilizing the IEEE802.1x method of creating a service binding in the Ethernet DSLAM 33. There are three major entities involved in the IEEE802.1x structure, a Supplicant 45, an Authenticator 46, and an Authentication Server 47. The Supplicant is an entity requesting access to a service. The Authenticator is an entity that enforces authentication before allowing access to the requested service. The Authentication Server is an entity that performs the actual authentication of the Supplicant on behalf of the Authenticator. For Ethernet DSL Access, the Supplicant is the end-user device, the Authenticator is the Ethernet DSLAM 33, and the Authentication Server is the RADIUS server 40. Protocol stacks for the Supplicant and Authenticator are illustrated at the bottom of FIG. 6.

IEEE802.1x adopts the Extensible Authentication Protocol (EAP) 48 as the mechanism for exchange of authentication messages. Between the Supplicant 45 and the Authenticator 46, EAP messages are encapsulated in Ethernet frames using the EAP over LAN (EAPOL) protocol 49. EAP is also a fundament for PPP access, and is described in RFC2284.

To initiate a session, the Supplicant 45 sends a Start-message to the Authenticator 46, using a multicast address defined by the 802.1x standard. The Authenticator requests the Supplicant to send the login credentials, and relays the Supplicant's response towards the Authentication Server 47. The Authentication Server and the Supplicant can then exchange further login information directly, with the Authenticator merely relaying information. If the login procedure ends successfully, the Authenticator enables the MAC address corresponding to the Supplicant, and creates a service binding 51 towards the S-VLAN 11 pointed out by the Authentication Server.

The end-user device 31a-31c is then able to access an S-VLAN 11a, 11b, and can issue a DHCP request towards a DHCP server 52 located within that S-VLAN in order to obtain an IP configuration. However, the device may already have issued several DHCP requests (for example, as a part of its initialization phase), but without being able to access any S-VLAN and thus no DHCP server. In order to keep the DHCP client "alive and agile" until the service binding is established, the Ethernet DSLAM 33 answers the DHCP requests with a temporary configuration and a very short lease time, encouraging the end-user device to renew its IP address in a short period of time, for example, within a few seconds. The DHCP request following a service binding creation will not be acknowledged by the local DHCP server 39 (FIG. 5), thus revoking the temporarily address and forcing the client (end-user device) to broadcast a DHCP discover message. This time, the DHCP traffic is not intercepted by the local DHCP server 39, but instead passes on to the S-VLAN 11 where the "real" DHCP server 52 answers. It should be noted that in new and future DHCP clients, a DHCP ForceRenew message may be utilized by the local DHCP server to make the DHCP client perform an immediate DHCP renewal instead of waiting for lease timeout. The ForceRenew feature is described in RFC3203.

An alternative method of providing login credentials is to utilize PPPoE. As previously discussed, PPPoE has some severe drawbacks, but the present invention does not suffer from these drawbacks because the invention only uses PPPoE between the end-user device 31a-31c and the Ethernet DSLAM 33, and only for establishing and terminating sessions. End-user payload traffic is conveyed without PPPoE as IP directly over Ethernet.

Figure 7:
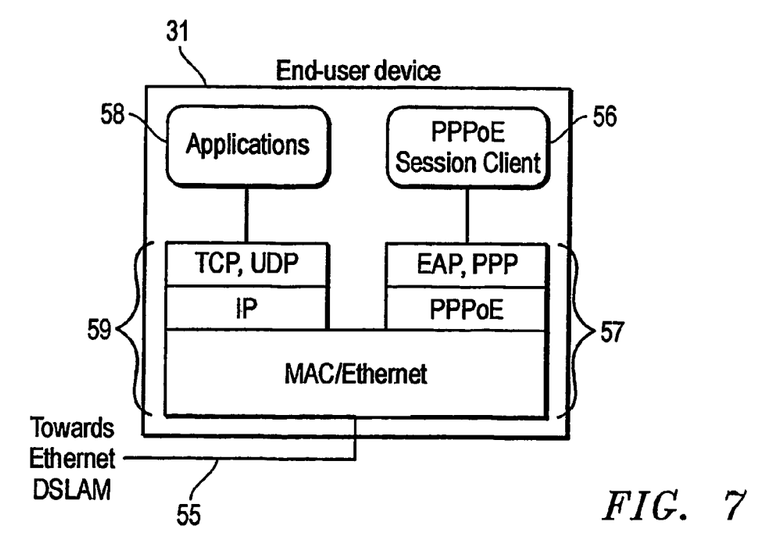
FIG. 7 is a protocol stack of an end-user device using PPPoE for service selection.

FIG. 7 is a protocol stack of an end-user device 31 using PPPoE for service selection. To create a service binding, the end-user device broadcasts a PPPoE initiation message 55 toward the Ethernet DSLAM 33. The SSH 34 in the Ethernet DSLAM terminates this message and establishes a PPPoE "connection", using the device MAC address. Via the PPPoE connection (right side of FIG. 7 including the PPPoE Session Client 56 and underlying PPPoE protocol stack 57), the user submits login credentials and is validated against the RADIUS server 40 (FIG. 5). If there is a successful validation, the SSH enables Ethernet traffic between the PPPoE connection's MAC address and the appointed S-VLAN 11. Then, as with the IEEE802.1x method, the IP stack of the device (left side of FIG. 7 including Applications 58 and underlying IP protocol stack 59) can issue a DHCP request towards the S-VLAN 11, and obtain IP configuration from a DHCP server 52.

Note specifically that the end-user device 31 does not send any IP traffic via its PPPoE interface. Therefore, this interface is configured with a non-routable IP address (e.g. in the 169.254.0.0/16 network) during the service binding. This service selection method may be limited to utilization with end-user PCs, since it requires the "dual stack" functionality depicted in FIG. 7. Note also, that PPP also uses the EAP protocol for authentication, giving an access functionality of the IP-DSLAM almost identical with that for IEEE802.1x. As described with IEEE802.1x, the device's DHCP client must be kept alive by a local DHCP server 39 in the DSLAM 33, until the service binding is created.

The present invention also enables service bindings to be broken and new bindings to be established. There are several ways that a service binding can be broken, depending on the method used to establish it. For IEEE802.1x, a session may end if the Supplicant 45 explicitly issues a Logoff-message, or if the Supplicant fails to renew the authentication after a certain amount of time. For PPPoE, the service binding may be broken when the end-user terminates the PPPoE session via the client 31. The client may offer a timeout feature, automatically ending the session after a certain period of idle time.

The DHCP client in the end-user device, however, is not explicitly informed about the broken service binding. Thus, the DHCP client may try to renew its IP address with the DHCP server corresponding to the broken service. This will of course fail, and at some time the DHCP client will return to the discovery phase. In the meantime, if a new service binding was created for the same device, the device's DHCP client is able to contact the DHCP server for this new service, and obtain a different IP address.

The time it takes for the DHCP client to learn that it must obtain its IP address from a new DHCP server depends on the original lease time. Thus, a short lease time results in a quicker change to a new service. However, a short lease time also generates more traffic and load on the DHCP server. Therefore, the frequency of service binding changes should be considered when determining acceptable waiting time for changing a service binding. If this change is something the end-users do very rarely (for example, once or twice a year), it may be acceptable to wait for longer periods of time (for example, up to 30 minutes or more) before the new service is available. However, if the end-users change service bindings often, a shorter waiting time may be more efficient.

As shown above, the MAC granularity embodiment replaces the current use of a PVC as the identifier of an S-VLAN, and instead, establishes a mapping between end-user MAC addresses and S-VLANs. However, to create a true multi-service solution, it is still relevant to support multiple PVCs for differential treatment of traffic over the local loop. The configuration of the Ethernet DSLAM 33 to use a specific PVC for downstream traffic may be accomplished simply by associating a given PVC to the MAC/S-VLAN combination when enabling the service binding. The QoS settings of the PVC must match the service delivered via the S-VLAN.

The mapping of the end-user's upstream traffic into PVCs may be done in various ways. The most straightforward way is to have the NT 32 act as a learning Ethernet bridge, seeing each PVC as a separate bridge port. In this way the Ethernet DSLAM 33 can "train" the NT to use the correct PVC just by sending downstream traffic (for example, Address Resolution Protocol (ARP) replies) on the PVC associated with the requesting MAC address. It should be remembered that the PVC and the end-user's MAC address are associated via the S-VLAN.

The following example illustrates how the present invention provides a service binding with dynamic service selection and end-user configuration. First, assume that an end-user device 31 has a learning bridge NT 32 connected to an Ethernet DSLAM 33 with two PVCs. The PVC QoS settings are predefined. Second, a service binding session is initiated from the end-user. This will be broadcast or flooded on both PVCs. The Ethernet DSLAM continues replying on either PVC, thus training the NT to subsequently use this PVC for unicast messages during the session binding phase. Third, when the RADIUS server 40 acknowledges the service binding, the corresponding S-VLAN 11 and PVC are identified in the acknowledging answer. This ties the device MAC address together with the PVC and the S-VLAN. Fourth, when the end-user device 31 subsequently broadcasts a DHCP request or an ARP request, the request is again sent upstream on both PVCs, but only the PVC where the device MAC address is registered will be allowed by the Ethernet DSLAM to forward traffic to the S-VLAN. Thus, duplicate messages are avoided. Fifth, answers from the DHCP server 52 or from an "ARPed" host (for example, a default gateway) are sent downstream only on the PVC where the destination (i.e., end-user device) MAC address is registered, thus training the NT learning bridge 32 to use this PVC for upstream traffic. In conclusion, the Ethernet DSLAM 33 maps upstream traffic from user-MAC (or user-VLAN) to an S-VLAN, and maps downstream traffic from an S-VLAN to a PVC (and possibly a user-VLAN).

It may be also be desirable for an end-user using flexible service selection to be able to use devices that do not support the IEEE802.1X or IP/PPP dual stack functionality. A first option to achieve this is to semi-statically configure the device MAC address in the Ethernet DSLAM via a provisioning system, an O&M system, or the like, and to assign the MAC address to a S-VLAN and a PVC. This may be done by the provider or by the end-user via a web portal, interfacing to the provisioning/O&M system via its northbound interface. The MAC/S-VLAN service binding type is thus retained in all cases.

A second option enabling an end-user using flexible service selection to use devices that do not support the IEEE802.1X or IP/PPP dual stack functionality is to utilize a service binding type other than MAC address to S-VLAN, namely, service channel to S-VLAN. A service channel is defined as a User-VLAN (T-VLAN) or a PVC. The binding may be semi-statically defined via the provisioning/O&M system. Alternatively, an end-user device that is service-selection capable may do the dynamic selection on behalf of all devices using a particular service channel. PVC to S-VLAN mapping is currently used in Ethernet DSL access, but is eliminated by the present invention because of its disadvantages. In the present invention, U-VLAN to S-VLAN mapping is preferred. With this function, one end-user device selects the service (S-VLAN and PVC) on behalf of all devices using this U-VLAN.

Figure 8:
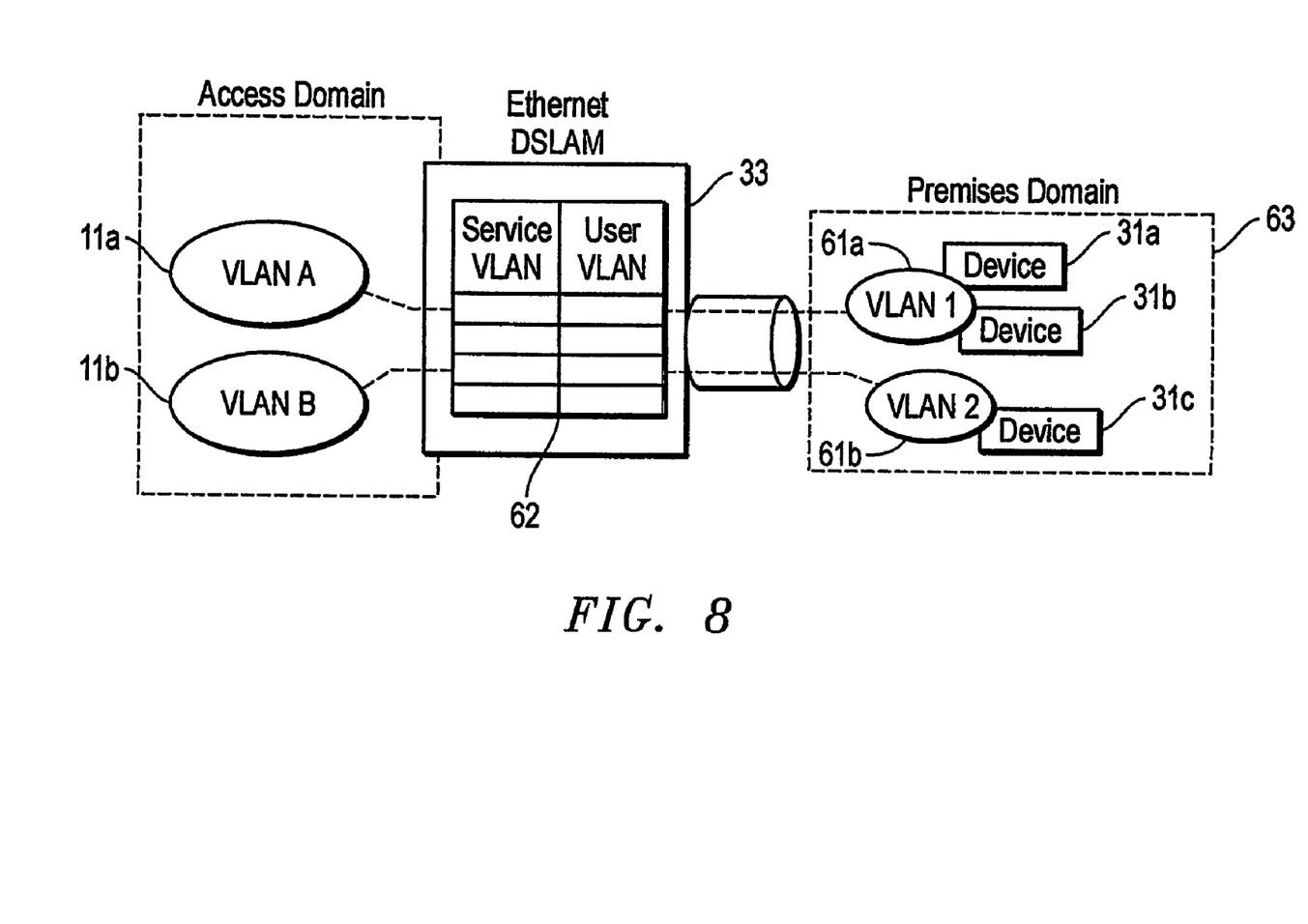
FIG. 8 is a simplified block diagram illustrating service bindings between user-VLANs and service-VLANS in accordance with the VLAN granularity embodiment of the present invention.

FIG. 8 is a simplified block diagram illustrating service bindings between user-VLANs 61a, 61b and service-VLANs 11a, 11b in accordance with the VLAN granularity embodiment of the present invention. In this embodiment, the Ethernet DSLAM 33 includes a mapping function 62 that maps U-VLANs to S-VLANs and vice versa. VLAN tags may be appended to upstream traffic at the Premises Domain 63.

Figure 9A:
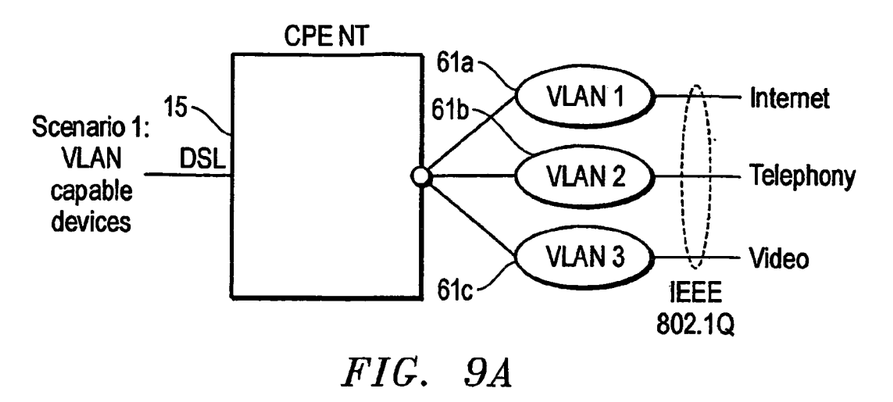
FIGS. 9A-9C are drawings illustrating three different methods of appending VLAN tags in upstream traffic at the end-user's premises.
Figure 9B:
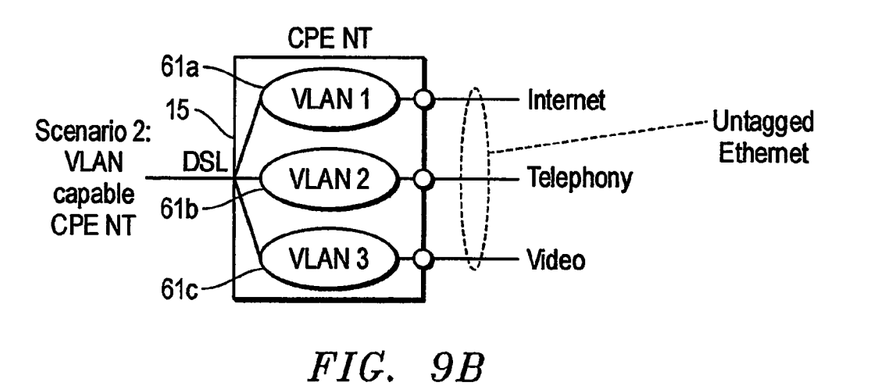
Figure 9C:
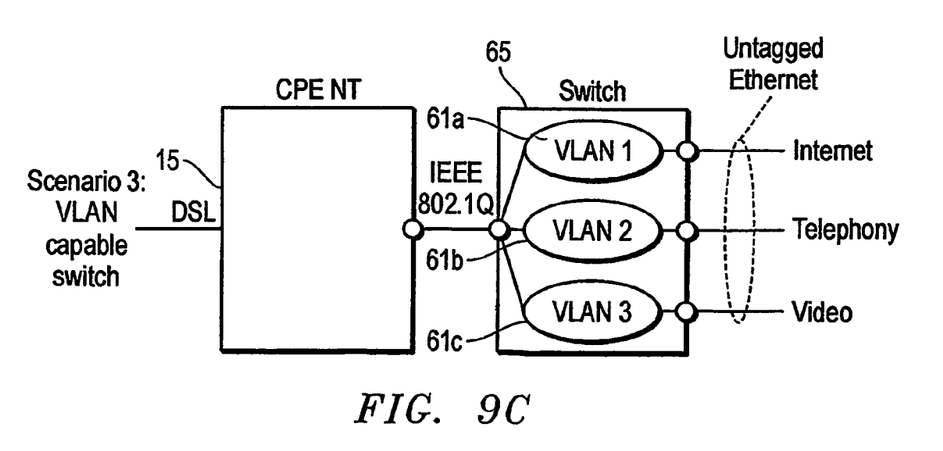

FIGS. 9A-9C are drawings illustrating three different methods of appending VLAN tags in upstream traffic at the end-user's Premises Domain 63. In FIG. 9A, it is assumed that the end-user devices (not shown) are VLAN capable, and each device provides a tag for VLAN-1 (Internet services) 61a, VLAN-2 (telephony services) 61b, or VLAN-3 (video services) 61c for use in U-VLAN to S-VLAN mapping. In FIG. 9B, the CPE/NT 15 is VLAN capable, and the CPE/NT determines the appropriate user-VLAN for U-VLAN to S-VLAN mapping. In FIG. 9C, an IEEE 802.1Q connection is made between the CPE/NT 15 and a VLAN capable switch 65. The switch then determines the appropriate user-VLAN for U-VLAN to S-VLAN mapping.

Thus, it has been shown that both MAC granularity and VLAN granularity may be utilized with the present invention. MAC granularity provides the advantage that no end-user equipment (CPE devices and NTs) needs to be VLAN aware. However, each device must login separately, and service bindings for simple devices must be semi-statically configured via the provisioning/O&M system. VLAN granularity provides the advantage that intelligent devices can select services on behalf of simple devices. However, some part of the end-user equipment must be VLAN capable.

It is also possible to support both MAC granularity and VLAN granularity simultaneously by adhering to certain rules in the Ethernet DSLAM 33. First, when an end-user device 31 is provisioned (via the provisioning/O&M system), the type of service selection is configured for that end-user device. This may be alternatively done by (a) traditional EDA functionality (semi-static PVC/S-VLAN binding), (b) dynamic service selection with MAC granularity, or (c) dynamic service selection with VLAN granularity. Utilizing untagged upstream traffic to create a service binding will always enable only the used source MAC address, in both options b and c. Utilizing VLAN upstream tagged traffic to create a service binding will, in option b, create a service binding only for the source MAC address, whereas in option c, it will create a service binding for the used U-VLAN. All three options (a, b, c) may co-exist in the same access network, but the end-user device should be configured as using either traditional access (option a) or dynamic service selection (option b/c). Table 1 below summarizes the simultaneous support of options b and c in creating service bindings.

TABLE 1

| UPSTREAM TRAFFIC FORMAT | GRANULARITY | |
|---|---|---|
| | MAC GRANULARITY | VLAN GRANULARITY |
| Untagged | Service binding: Source MAC ↔ S-VLAN | Service binding: Source MAC ↔ S-VLAN |
| VLAN tagged | Service binding: Source MAC ↔ S-VLAN | Service binding: U-VLAN ↔ S-VLAN |

The following steps are taken to configure the Ethernet DSLAM 33 with the response from the RADIUS server 37. The Access Network Provider defines services with a name, a S-VLAN, a Class of Service (CoS) value (Ethernet priority), and the Access Service Provider(s) who are allowed to use this service in their offerings to end-users. The Access Service Provider assigns services to end-users, and may customize these services to fit individual end-users. The customization includes PVC settings, bandwidth settings, and filter settings.

The RADIUS client 36 in the Ethernet DSLAM 33 requests validation of an end-user by issuing a dataset of {end-user ID, username, password} towards the Local RADIUS Server 37. There is one Local RADIUS Server per access domain, but the Local RADIUS Server may interface with remotely located RADIUS servers 40 belonging to various service providers. For each service the end-user is allowed to access, the Access Service Provider has already registered a number of service attributes, such as:

Service name;
Domain name used by the end-user to point out the requested service;
Virtual Path Identifier/Virtual Circuit Identifier (VPI/VCI) values for the PVC used for this service;
Bandwidth for the PVC used for this service;
Filter settings;
MAC granularity/VLAN granularity;
Service duration;
Charging information;
Authentication;
Password (in case of local authentication done by the Access Service Provider); and/or Remote RADIUS Server IP address or Fully Qualified Domain Name (FQDN) in case of authentication against a remote RADIUS server.

Upon successful validation, the relevant service attributes are sent from the local RADIUS server 37 to the Ethernet DSLAM 33 for establishing the service binding.

The present invention thus provides an Ethernet bridging DSLAM 33 with BRAS functionality. With the present invention, no central BRAS is required, thus solving the disadvantages of this node and eliminating the cost for this node. Instead, a BRAS solution is created that is scalable both upwards and downwards, efficiently supporting multicast, and with little end-user impact in case of failure (compared to failure of a centralized BRAS). A true multi-service scenario (including multiple PVCs) is supported with a simple CPE NT that needs no configuration by the end-user. Additionally, the access methods (PPPoE and IEEE802.1X) are equivalent to today's methods, so for end-users the implementation is familiar.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. An Ethernet Digital Subscriber Line Access Multiplexer (DSLAM) configured to provide dynamic service selection and end-user configuration of service bindings in a digital communication system, wherein the Ethernet DSLAM includes a processor coupled to a non-transitory memory device, wherein when the processor executes computer program instructions stored on the non-transitory memory device, the Ethernet DSLAM is caused to:
    receive login credentials and a service request from an end-user device;
    authenticate the login credentials through an authentication server;
    configure the Ethernet DSLAM to provide an advanced service binding corresponding to the requested service utilizing a plurality of attributes received from the authentication server, said attributes including an identification of an access network for the requested service, and an identification of a Permanent Virtual Circuit (PVC) on a local DSL loop associated with the end-user device, wherein by configuring the Ethernet DSLAM to provide the advanced service binding, a Broadband Remote Access Server (BRAS) is no longer needed; and
    train a bridging network terminal (NT) having a plurality of PVCs to utilize the identified PVC for sending upstream traffic from the end-user terminal to the Ethernet DSLAM, wherein the Ethernet DSLAM is configured to send initial downstream traffic from the Ethernet DSLAM to the end-user device utilizing the identified PVC.

2. The Ethernet DSLAM of claim 1, wherein the end-user device has a Media Access Control (MAC) address, and the requested service is accessed through a Service Virtual Local Area Network (S-VLAN), and the Ethernet DSLAM is configured to map the S-VLAN for the requested service to the MAC address for the end-user device.

3. The Ethernet DSLAM of claim 1, wherein the Ethernet DSLAM is configured to receive the login credentials and the service request from the end-user device utilizing a User Virtual Local Area Network (U-VLAN) through which the Ethernet DSLAM communicates with the end-user device, and the requested service is accessed through a Service Virtual Local Area Network (S-VLAN), and the Ethernet DSLAM is configured to map the S-VLAN for the requested service to the U-VLAN for the end-user device.

4. The Ethernet DSLAM of claim 1, wherein the Ethernet DSLAM includes a RADIUS client that communicates with an external RADIUS authentication server to authenticate the login credentials.

5. An Ethernet Digital Subscriber Line Access Multiplexer (DSLAM) for providing dynamic service selection and end-user configuration of service bindings in a digital communication system, said Ethernet DSLAM comprising:
    a plurality of subscriber ports for receiving login credentials and service requests from end-user devices, and for communicating data traffic to and from the end-user devices, wherein an identified subscriber port communicates with an identified end-user device;
    a traffic mapper that maps data traffic between a plurality of Service Virtual Local Area Networks (S-VLANs) and the subscriber ports;
    a RADIUS client that sends login credentials and a service request from the identified end-user device to an external RADIUS server for authentication, receives a plurality of attributes from the external RADIUS server, and utilizes the attributes to configure the Ethernet DSLAM to provide an advanced service binding corresponding to the requested service, said attributes including an identification of an S-VLAN through which the requested service is accessed, and an identification of a Permanent Virtual Circuit (PVC) on a local DSL loop associated with the end-user device, wherein by configuring the Ethernet DSLAM to provide the advanced service binding, a Broadband Remote Access Server (BRAS) is no longer needed; and
    a Service Selection Controller that receives the attributes from the RADIUS client and sends mapping control information to the traffic mapper, thereby enabling the traffic mapper to establish a service binding between the identified end-user device and the S-VLAN through which the requested service is accessed.

6. The Ethernet DSLAM of claim 5, wherein the service binding is established utilizing the IEEE802.1x protocol.

7. The Ethernet DSLAM of claim 5, wherein the service binding is established utilizing the Point-to-Point Protocol over Ethernet (PPPoE) protocol.

8. The Ethernet DSLAM of claim 5, further comprising a Dynamic Host Configuration Protocol (DHCP) server that answers DHCP requests sent by the identified end-user device prior to establishment of the service binding, said DHCP server sending a temporary configuration and a short lease time to the identified end-user device.

9. The Ethernet DSLAM of claim 8, wherein the DHCP server ignores DHCP requests sent by the identified end-user device after establishment of the service binding, thereby forcing the end-user device to broadcast a DHCP discover message which is passed on to a second DHCP server in the SVLAN through which the requested service is accessed.

10. A method of providing dynamic service selection and end-user configuration of service bindings in a digital communication system, said method comprising the steps of:
    sending login credentials and a service request from an end-user device to an Ethernet Digital Subscriber Line Access Multiplexer (DSLAM);
    sending the login credentials and service request from the Ethernet DSLAM to an authentication server;

sending from the authentication server to the Ethernet DSLAM, a plurality of service binding attributes, said attributes including an identification of an access network for the requested service, and an identification of a Permanent Virtual Circuit (PVC) on a local DSL loop associated with the end-user device;

utilizing the service binding attributes by the Ethernet DSLAM to configure an advanced service binding corresponding to the requested service, wherein by configuring the Ethernet DSLAM to provide the advanced service binding, a Broadband Remote Access Server (BRAS) is no longer needed; and training a bridging network terminal (NT) having a plurality of PVCs to utilize the identified PVC for sending upstream traffic from the end-user terminal to the Ethernet DSLAM, said training step including sending initial downstream traffic from the Ethernet DSLAM to the end-user device utilizing the identified PVC.

11. The method of claim 10, wherein the end-user device has a Media Access Control (MAC) address, and the requested service is accessed through a Service Virtual Local Area Network (S-VLAN), and the step of utilizing the service binding attributes by the Ethernet DSLAM to configure a service binding includes mapping by the Ethernet DSLAM, the S-VLAN for the requested service to the MAC address for the end-user device.

12. The method of claim 10, wherein the Ethernet DSLAM communicates with the end-user device through a User Virtual Local Area Network (U-VLAN), and the requested service is accessed through a Service Virtual Local Area Network (SVLAN), and the step of utilizing the service binding attributes by the Ethernet DSLAM to configure a service binding includes mapping by the Ethernet DSLAM, the S-VLAN for the requested service to the U-VLAN for the end-user device.

13. The method of claim 10, wherein the step of sending the login credentials and service request from the Ethernet DSLAM to an authentication server includes sending the login credentials and service request from a RADIUS client in the Ethernet DSLAM to an external RADIUS authentication server.

14. A method of providing dynamic service selection and end-user configuration of service bindings in a digital communication system, said method comprising the steps of:
configuring in an Ethernet Digital Subscriber Line Access Multiplexer (DSLAM), a plurality of subscriber ports for communicating with a plurality of end-user devices;

receiving login credentials and a service request from an identified end-user device utilizing an identified subscriber port;

sending the login credentials and the service request from a RADIUS client in the Ethernet DSLAM to an external RADIUS server for authentication;

receiving from the external RADIUS server, a plurality of attributes for an advanced service binding corresponding to the requested service, said attributes including an identification of a Service Virtual Local Area Network (S-VLAN) through which the requested service is accessed, and an identification of a Permanent Virtual Circuit (PVC) on a local DSL loop associated with the end-user device;

configuring the Ethernet DSLAM to provide the service binding corresponding to the requested service, wherein by configuring the Ethernet DSLAM to provide the advanced service binding, a Broadband Remote Access Server (BRAS) is no longer needed; and mapping data traffic by the Ethernet DSLAM between the S-VLAN through which the requested service is accessed and the identified subscriber port communicating with the identified end-user device.

15. The method of claim 14, wherein the service binding is established utilizing the IEEE802.1x protocol.

16. The method of claim 14, wherein the service binding is established utilizing the Point-to-Point Protocol over Ethernet (PPPoE) protocol.

17. The method of claim 14, further comprising the steps of:
receiving by the Ethernet DSLAM, a Dynamic Host Configuration Protocol (DHCP) request from the identified end-user device prior to establishment of the service binding; and sending an answer to the end-user device from a DHCP server in the Ethernet DSLAM, wherein the answer includes a temporary configuration and a short lease time.

18. The method of claim 14, further comprising the steps of:
receiving by the Ethernet DSLAM, a Dynamic Host Configuration Protocol (DHCP) request from the identified end-user device;

determining by the Ethernet DSLAM, whether the service binding has been established;

upon determining that the service binding has not been established, sending an answer to the end-user device from a DHCP server in the Ethernet DSLAM, wherein the answer includes a temporary configuration and a short lease time; and upon determining that the service binding has been established, ignoring the DHCP request, thereby forcing the end-user device to broadcast a DHCP discover message which is passed on to a second DHCP server in the S-VLAN through which the requested service is accessed.

* * * * *